United States Patent
Frederic et al.

(10) Patent No.: US 8,472,469 B2
(45) Date of Patent: Jun. 25, 2013

(54) CONFIGURABLE NETWORK SOCKET AGGREGATION TO ENABLE SEGMENTATION OFFLOAD

(75) Inventors: Maria J. Frederic, Kodaikanal (IN); Nikhil Hegde, Round Rock, TX (US); Sivakumar Krishnasamy, Dharmapuri (IN); Vishal R Mansur, Hubil (IN)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/879,841

(22) Filed: Sep. 10, 2010

(65) Prior Publication Data

US 2012/0063449 A1    Mar. 15, 2012

(51) Int. Cl.
*H04L 12/66* (2006.01)
*H04L 12/50* (2006.01)
*H04L 12/28* (2006.01)
*H04L 12/56* (2006.01)

(52) U.S. Cl.
USPC .................... 370/463; 370/359; 370/419

(58) Field of Classification Search
USPC ................... 370/359, 389, 419, 463
See application file for complete search history.

(56) References Cited

U.S. PATENT DOCUMENTS

| | | | |
|---|---|---|---|
| 7,313,148 B2 | 12/2007 | Chu et al. | |
| 7,558,873 B1 | 7/2009 | Maufer | |
| 2005/0147126 A1 | 7/2005 | Qiu et al. | |
| 2006/0013256 A1* | 1/2006 | Lee et al. | 370/473 |
| 2007/0133582 A1* | 6/2007 | Banerjee et al. | 370/412 |
| 2008/0151922 A1 | 6/2008 | Elzur et al. | |
| 2009/0232137 A1 | 9/2009 | Cherian et al. | |

* cited by examiner

*Primary Examiner* — Ronald Abelson
(74) *Attorney, Agent, or Firm* — DeLizio Gilliam, PLLC (57) ABSTRACT

A network device can implement configurable socket aggregation to enable segmentation offload in the network device. In one embodiment, it is determined, at the network device, to create a network socket for an application of the network device to initiate a network connection for the application. Socket aggregation parameters are determined for the network socket associated with the application. The network socket is defined based, at least in part, on the socket aggregation parameters. A plurality of packets received from the application associated with the network socket are aggregated. It is determined, based on said aggregating the plurality of packets, whether at least one aggregation limit associated with the socket aggregation parameters is reached. An aggregate packet is provided to a network adapter of the network device to perform segmentation offload in response to said determining that at least one aggregation limit associated with the socket aggregation parameters is reached.

20 Claims, 5 Drawing Sheets

FIG. 5 with pre-designed applications (applications that are not designed to send packets that exceed the MTU) and as will be further described below.

CONFIGURABLE NETWORK SOCKET AGGREGATION TO ENABLE SEGMENTATION OFFLOAD

BACKGROUND

Embodiments of the inventive subject matter generally relate to the field of computer systems, and, more particularly, to configurable network socket aggregation to enable segmentation offload.

A maximum transmission unit (MTU) of a communication network is the maximum protocol data unit that can be transferred on the physical medium. The MTU is an inherent property of the physical media associated with the network protocol. For example, the MTU for Ethernet is 1500 bytes. In a network protocol stack, the network layer or Internet protocol (IP) layer may implement datagram fragmentation so that data packets with size larger than the MTU associated with network protocol are fragmented according to the MTU before being delivered to the data link layer and the network adapter. Alternatively, large send or segmentation offload may be implemented by network adapters or network interface cards (NICs) to offload the fragmentation of packets according to the MTU to the network adapter hardware. The network protocol stack can send the packets (without having to perform fragmentation in software) to the network adapter to perform the fragmentation (if necessary) according to the MTU in hardware.

SUMMARY

Various embodiments for implementing configurable socket aggregation to enable segmentation offload in a network device are described herein. In one embodiment, it is determined, at the network device, to create a network socket for an application of the network device to initiate a network connection for the application. Socket aggregation parameters are determined for the network socket associated with the application. The network socket is defined based, at least in part, on the socket aggregation parameters. A plurality of packets received from the application associated with the network socket are aggregated. It is determined, based on said aggregating the plurality of packets received from the application, whether at least one aggregation limit associated with the socket aggregation parameters is reached. An aggregate packet is provided to a network adapter of the network device to perform segmentation offload in response to said determining that at least one aggregation limit associated with the socket aggregation parameters is reached.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to implementing configurable network socket aggregation to enable segmentation offload in systems that implement transmission control protocol (TCP), in other embodiments, operations described herein for implementing configurable network socket aggregation to enable segmentation offload can be extended to systems that implement other communication standards and protocols. In other instances, well-known instruction instances, protocols, structures and techniques have not been shown in detail in order not to obfuscate the description.

As described above, an MTU of a communication network is the maximum protocol data unit that can be transferred on the physical medium. In a network protocol stack, the network layer or Internet protocol (IP) layer can implement datagram fragmentation so that data packets with size larger than the MTU associated with network protocol are fragmented according to the MTU before being provided to the network adapter. Transport protocols such as TCP can negotiate a maximum segment size (MSS) during connection establishment. The MSS is the largest amount of data that the TCP will send in a single segment. In TCP, the MSS can be set to a size that is less than the MTU to avoid IP layer fragmentation. Alternatively, large send or segmentation offload (e.g., TCP segmentation offload) may be implemented by network adapters or NICs to offload the fragmentation of packets according to the MTU to the network adapter hardware. The network protocol stack can send the packets (without having to perform fragmentation in software) to the network adapter to perform the fragmentation (if necessary) according to the MTU in hardware. Offloading the fragmentation to the network adapter hardware can improve system performance. For example, segmentation offload provides significant performance benefits in systems with Gigabit Ethernet NICs. In some cases, applications have been written to send relatively small packets (i.e., packets with size less than the MTU) through the network protocol stack to avoid IP layer fragmentation. However, systems that support segmentation offload cannot take advantage of the performance benefits of implementing segmentation offload if the network adapter receives small packets from the network protocol stack. In some cases, system performance can be reduced due to the increased packet traffic through the network protocol stack, and the overhead associated with the headers of each of the small packets. Furthermore, the system performance can be reduced due to the number of direct memory access (DMA) operations performed to send the packets from the operating system memory to the network adapter memory.

In some embodiments, systems can implement configurable network socket aggregation to enable segmentation offload to the network adapters regardless of the size of the packets sent from the applications to the network protocol stack. When a network socket is created for an application, socket aggregation parameters are determined for the network socket associated with the application. For example, socket aggregation parameters (such as a maximum aggregation size parameter and an aggregation timeout parameter) are determined and the network socket is defined based on the socket aggregation parameters. In some implementations, the socket aggregation parameters can be determined from the application, from predefined or global socket aggregation parameters, or from a system administrator. After defining the network socket, packets received from the application are aggregated at the socket level according to the aggregation limits defined by the socket aggregation parameters to send relatively large packets to the network adapter (via the network protocol stack) and enable segmentation offload, as will be further described below with reference to FIGS. 1-3.

Figure 1:
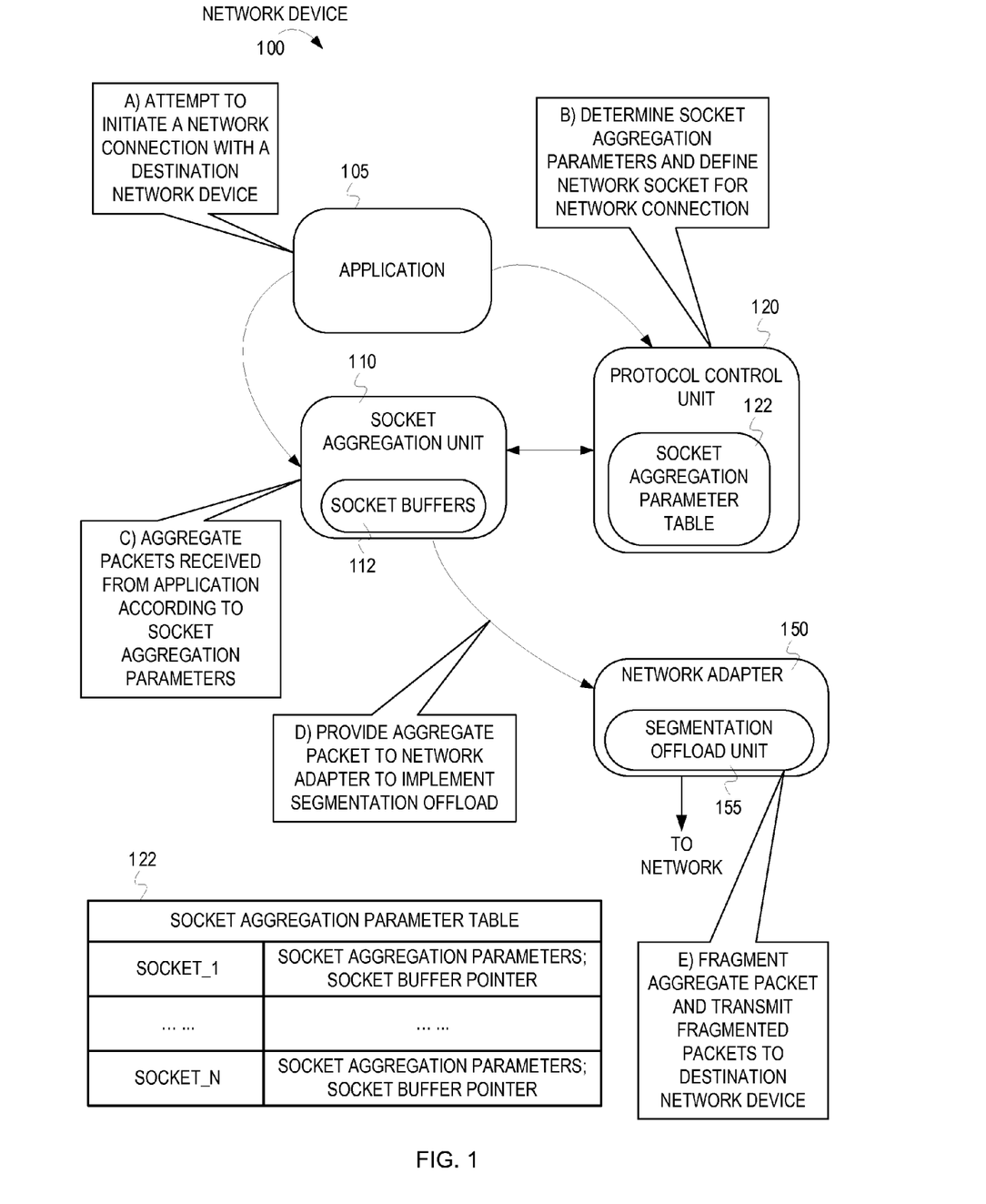
FIG. 1 is an example conceptual diagram illustrating example operations for implementing configurable network socket aggregation to enable segmentation offload in a network device.

FIG. 1 is an example conceptual diagram illustrating example operations for implementing configurable network socket aggregation to enable segmentation offload in a network device. As shown in FIG. 1, the network device 100 can comprise an application 105, a socket aggregation unit 110, a protocol control unit 120, and a network adapter 150. The network adapter 150 includes a segmentation offload unit 155 for performing segmentation offload (e.g., TCP segmentation offload). The socket aggregation unit 110 and the protocol unit 120 can implement network socket aggregation (for packets received from the application 105) to enable the network adapter 150 to perform segmentation offload, as will be further described below. The network device 100 can be a client or server on a communication network that implements a transport layer connection protocol (e.g., TCP) to establish connections with other network devices.

At stage A, the application 105 of the network device 100 attempts to initiate a network connection via a communication network to communicate with a destination network device. For example, a source network device attempts to initiate a network connection via a local area network (LAN) with a destination network device. In another example, a client network device attempts to establish a network connection via the Internet with a server network device. In one embodiment, the application 105 can provide an indication to the protocol control unit 120 to create a network socket for the application 105 to initiate the network connection. For example, the application 105 can send a special type of packet to the protocol control unit 120 to cause the protocol control unit 120 to create the network socket. In one example, a network socket can be a communications connection point (or endpoint) of a bidirectional inter-process communication flow across a communications network (e.g., between a client and a server).

At stage B, the protocol control unit 120 determines socket aggregation parameters associated with the network socket for the application, and defines the network socket based on the socket aggregation parameters. In some implementations, either the application 105 (or a system administrator via an API) provides the socket aggregation parameters to the protocol control unit 120 to customize the network socket aggregation, or the protocol control unit 120 utilizes predefined socket aggregation parameters (e.g., global socket aggregation parameters associated with the application 105), as will be further described below with reference to FIG. 2. After determining the socket aggregation parameters, the protocol control unit 120 then defines the network socket for the application based on the socket aggregation parameters. The socket aggregation parameters can include a maximum aggregation size parameter and an aggregation timeout parameter. The maximum aggregation size parameter can define the maximum amount of data that can be aggregated at the socket aggregation unit 110 before the data is sent to the network adapter 150 via the network protocol stack. For example, for TCP, the maximum aggregation size parameter can be a value that is substantially greater than the MTU size (e.g., 10 kilobytes) since the network adapter 150 supports segmentation offload. The aggregation timeout parameter can define the timeout value (time period) that, if expired during aggregation, causes the data to be sent to the network adapter 150 via the network protocol stack. For example, the aggregation timeout parameter can be set to a value that introduces a delay that is acceptable for the application 105 (e.g., 100 milliseconds). In one embodiment, the protocol control unit 120 defines the network socket with the socket aggregation parameters by creating a data structure that stores the network aggregation parameters and also a pointer to the corresponding socket buffer 112 of the socket aggregation unit 110. For example, the protocol control unit 120 can create the socket aggregation table 122 to define the network socket with the socket aggregation parameters, and store the pointer to the address of the corresponding socket buffer 112. As shown, the socket aggregation table 122 can include socket aggregation parameters and socket buffer pointers for multiple network sockets (e.g. $SOCKET\_1\text{-}SOCKET\_N$) that have been created in the network device 100. The network aggregation parameters define the criteria (i.e., aggregation limits) in which the socket aggregation unit 110 sends the aggregated data received from the application 105 to the network adapter 150 to perform segmentation offload, as will be further described below. It is noted that, in some implementations, the socket aggregation parameters can be obtained any time after the network socket is created to define the socket aggregation criteria, and the socket aggregation parameters can be dynamically changed (e.g., by the application 105, system administrator, etc.) any time after the network socket has been created to dynamically redefine or reconfigure the socket aggregation criteria.

The protocol control unit 120 can be implemented in software and/or firmware associated with the transport layer of the network device 100. For example, in TCP, the protocol control unit 120 can be implemented in the TCP layer. The protocol control unit 120 may also be implemented in software and/or firmware that is distributed across both the transport layer and the socket layer of the network device 100. The socket aggregation unit 110 can be implemented in software and/or firmware in the socket layer, and can include socket buffers 112 used to aggregate data received from the application 105 and also send the data to the network adapter 150 (via the network protocol stack). The socket aggregation unit 110 may also be implemented in software and/or firmware that is distributed across both the socket layer and the transport layer of the network device 100. It is noted, however, that in other embodiments the protocol control unit 120 and the socket aggregation unit 110 may comprise functionality that is distributed across other modules and components associated with the operating system of the network device 110.

At stage C, the socket aggregation unit 110 begins aggregating packets received from the application 105 at the socket level. The packets received from the application 105 are associated with the network connection that the application 105 initiated for communicating with the destination network device. The socket aggregation unit 110 aggregates the packets according to the limits defined by the socket aggregation parameters. Furthermore, when the socket aggregation unit 110 receives a packet from the application 105, the socket aggregation unit 110 can determine whether the packet is one of a plurality of predefined packet types that should not be delayed, as will be further described below with reference to FIGS. 2-3. For example, in TCP, the socket aggregation unit 110 determines whether the packet is a SYN, FIN, RST, ACK, or URG packet type. If the packet is not one of the plurality of predefined packet types, the socket aggregation unit 110 aggregates the packet. For example, the socket aggregation unit 110 aggregates the packet by adding the packet to the socket buffer 112. However, if the packet is one of the predefined packet types, the socket aggregation unit 110 does not aggregate the packet (i.e., does not add the packet to the socket buffer 112). Instead, the socket aggregation unit 110 immediately sends the packet to the network adapter 150 via the network protocol stack.

At stage D, the socket aggregation unit 110 provides an aggregate packet to the network adapter 150 via the network protocol stack to implement segmentation offload. The socket aggregation unit 110 determines whether at least one of the limits defined by the socket aggregation parameters is reached during aggregation of the packets from the application 105, as will be further described below with reference to FIG. 2-3. In one example, in response to determining that one of the limits defined by the socket aggregation parameters is reached, the aggregated data in the socket buffer 112 is provided to a packet generation unit (not shown) of the socket aggregation unit 110 to generate an aggregate packet and send the aggregate packet to the network adapter 150. The packet generation unit of the socket aggregation unit 110 can be implemented in the transport layer (e.g., TCP layer) of the network protocol stack. In another example, in response to determining that one of the limits defined by the socket aggregation parameters is reached, the socket aggregation unit 110 provides the aggregated data in the socket buffer 112 to a packet generation unit (not shown) of the protocol control unit 120 to generate the aggregate packet and send the aggregate packet to the network adapter 150 to implement segmentation offload. It is noted, however, that in other implementations the functionality associated with the packet generation unit can be distributed across both the socket aggregation unit 110 and the protocol control nit 120, or implemented within (or distributed across) other components or modules within the network protocol layer.

At stage E, the network adapter 150 fragments the aggregate packet and transmits the fragmented data packets to the destination network device. In one implementation, the segmentation offload unit 155 performs segmentation offload by fragmenting the aggregate packets into smaller packets for transmission to the destination network device. For example, for TCP, the segmentation offload unit 155 fragments the packets into smaller packets with size that is less than or equal to the MTU size.

In addition to improving system performance by implementing segmentation offload, the configurable network socket aggregation technique improves system performance by reducing the packet traffic through the network protocol stack. The packet traffic through the network protocol stack is reduced by aggregating packets at the socket level based on the socket aggregation parameters, and sending relatively large packets through the network protocol stack. Furthermore, reducing the packet traffic through the network protocol stack (by sending larger packets) reduces the overhead associated with the headers of each of the packets. For example, instead of sending 100 small packets of 100 bytes, each with 40 bytes of header overhead, a larger 10 kilobyte packet is aggregated and sent with a total header overhead of 40 bytes. The system performance can also improved by reducing the number of direct memory access (DMA) operations that are performed to send the aggregated packets from the operating system memory (e.g., via PCI) to the network adapter memory.

In some embodiments, the application that initiates the network socket can determine whether to enable or disable the socket aggregation functionality for the network socket by setting a socket option that enables or disables the socket aggregation functionality and also by providing the socket aggregation parameters. For example, the application can send a packet with one or more bits that indicate whether to enable or disable the socket aggregation functionality for the network socket. In this example, if the application is enabling the socket aggregation functionality, the packet can also include the socket aggregation parameters. The system administrator (or other user) can also enable or disable the socket option to enable or disable the socket aggregation functionality, and provide the socket aggregation parameters (e.g., via an API). It is noted, however, that in other implementations the socket option can be enabled or disabled, and the socket aggregation parameters can be determined, by various other methods. For example, the socket aggregation unit 110, the protocol control unit 120, and/or another component or module in the network protocol stack can automatically enable or disable the socket option for the network socket based on the type of application that initiated the network socket, and can also utilize predefined or global socket aggregation parameters.

Figure 2:
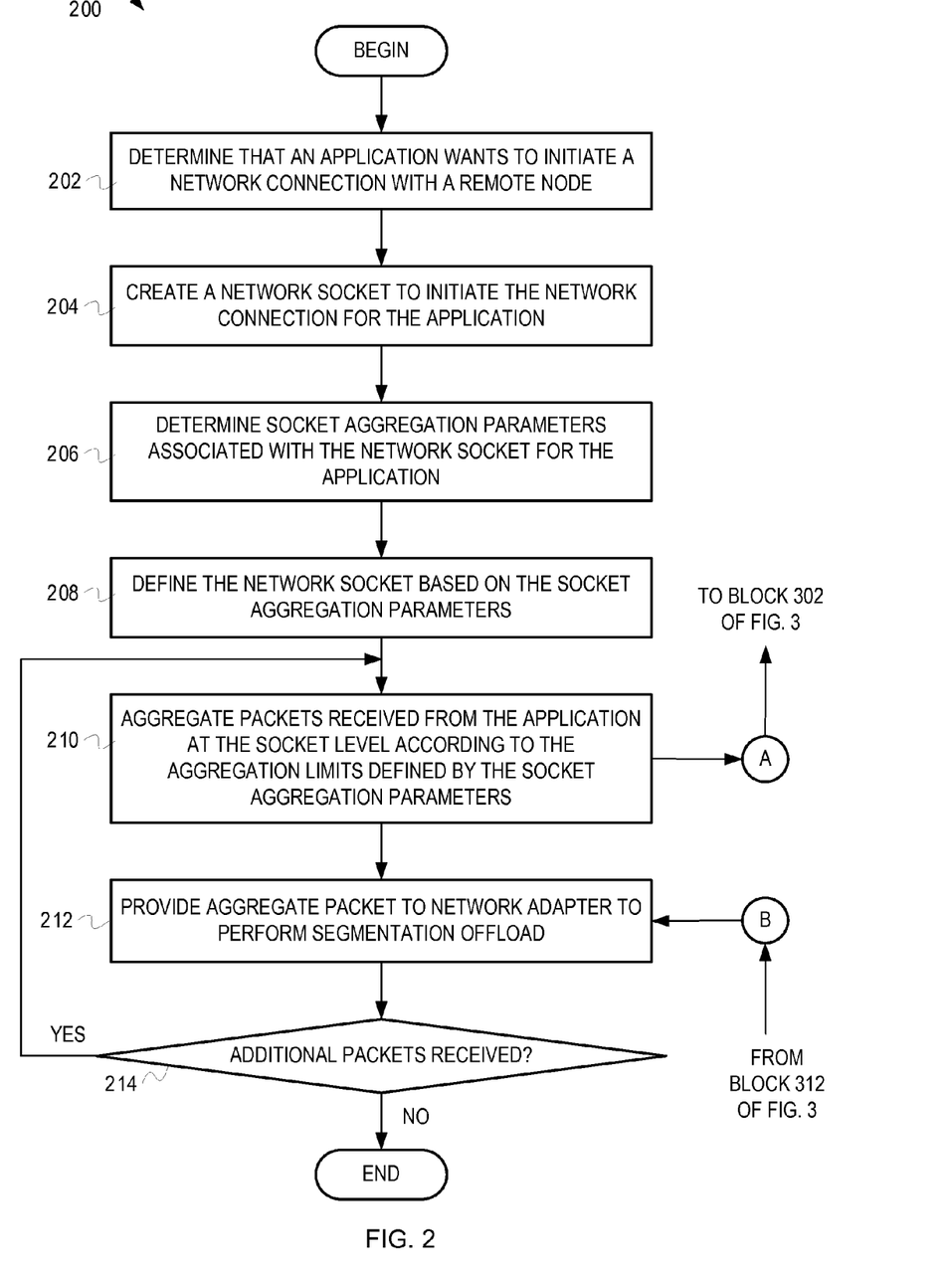
FIG. 2 is a flow diagram illustrating example operations for implementing configurable network socket aggregation to enable segmentation offload in a network device.

FIG. 2 is a flow diagram ("flow") 200 illustrating example operations for implementing configurable network socket aggregation to enable segmentation offload in a network device. The flow begins at block 202.

It is determined that an application of a network device wants to initiate a network connection with a remote node (202). In one embodiment, the protocol control unit 120 determines that the application 105 of the network device 100 wants to initiate a network connection with a destination network device. For example, the application 105 may be a browser application of the network device 100 that is attempting to initiate a network connection with a remote web server. The flow continues at block 204.

A network socket is created to initiate the network connection for the application (204). For example, the protocol control unit 120 creates a network socket to initiate the network connection for the application 105. The protocol control unit 120 can create the network socket in response to detecting an indication (e.g., a special packet type or message) from the application 105 to initiate the network connection with the remote node. The flow continues at block 206.

Socket aggregation parameters associated with the network socket for the application are determined (206). The protocol control unit 120 determines the socket aggregation parameters associated with the network socket. The protocol control unit 120 can determine the socket aggregation parameters from the application 105, from a system administrator, or from predefined or global socket aggregation parameters. For example, the application 105 can provide the socket aggregation parameters to the protocol control unit 120 to customize the socket aggregation limits for the network socket. In one specific example, in the same packet that the application 105 provides to the protocol control unit 120 to create the network socket, the application 105 can provide the socket aggregation parameters. The application 105 can also set a flag (i.e., one or more bits) in the packet indicating that the application wants to enable the socket option for packet aggregation ("socket aggregation option"). The application 105 can indicate whether to enable or disable the socket aggregation option, and also indicate the aggregation limits associated with the socket aggregation parameters. If the socket aggregation parameters are not provided when the network socket is created, the application 105 can provide the socket aggregation parameters (and socket aggregation option flag) any time after the network socket is created. Furthermore, the application 105 can dynamically change the socket aggregation parameters and enable/disable the socket aggregation option at any time to redefine or reconfigure the network socket. Similarly, a system administrator can customize each network socket that is created by indicating whether to enable or disable the socket aggregation option, and also indicate the aggregation limits associated with the socket aggregation parameters (e.g., via an API). The system administrator can also set predefined or global socket aggregation parameters that will be utilized for applications that do not indicate (or are not programmed to indicate) whether to enable or disable the socket aggregation option and the socket aggregation parameters. In other words, by default, if an application does not specify the socket aggregation parameters, the protocol control unit 120 can utilize predefined socket aggregation parameters (predefined by the system administrator, developer, etc.) to define the network socket. Applications can override the default configurations and customize the network socket by providing socket aggregation parameters. In some implementations, the protocol control unit 120 can be programmed with different sets of predefined or global socket aggregation parameters that are dependent of the type of application or desired network activity. In one example, the protocol control unit 120 can detect the type of application that is attempting to establish a network connection, and select the predefined socket aggregation parameters based on the type of application. The flow continues at block 208.

The network socket is defined based on the socket aggregation parameters (208). The protocol control unit 120 defines the network socket for the application 105 based on the socket aggregation parameters. The socket aggregation parameters can include a maximum aggregation size parameter and an aggregation timeout parameter. The maximum aggregation size parameter can define the maximum amount of data that can be aggregated at the socket aggregation unit 110 before the data is sent to the network adapter 150 via the network protocol stack. For example, for TCP, the maximum aggregation size parameter can be a value that is substantially greater than the MTU size (e.g., 10 kilobytes) since the network adapter 150 supports segmentation offload. In this example, the application 105 (or the system administrative) can customize the maximum aggregation size parameters, as desired, up to a predefined protocol limit (e.g., 64 kilobytes). The aggregation timeout parameter can define the timeout limit that, if expired during aggregation, causes the data to be sent to the network adapter 150 via the network protocol stack. For example, the aggregation timeout parameter can be set to a value that introduces an aggregation delay that is acceptable for the application 105 or the system administrator (e.g., 100 milliseconds). In one embodiment, the protocol control unit 120 defines the network socket with the socket aggregation parameters by creating a data structure that stores the network aggregation parameters and also a pointer to the corresponding socket buffer 112 of the socket aggregation unit 110. For example, the protocol control unit 120 can create the socket aggregation table 122 to define the network socket with the socket aggregation parameters, and store the pointer to the address of the corresponding socket buffer 112. The flow continues at block 210.

The packets received from the application are aggregated at the socket level according to the aggregation limits defined by the socket aggregation parameters (210). The socket aggregation unit 110 aggregates a plurality of packets received from the application 105 according to the aggregation limits defined by the socket aggregation parameters (i.e., the maximum aggregation size and the aggregation timeout). Furthermore, the socket aggregation unit 110 can determine whether each received packet is one of a plurality of predefined packet types that should not be delayed (e.g., in TCP, packet types such as SYN, FIN, RST, ACK, etc.). The process for packet aggregation at the socket level is described with reference to FIG. 3, starting at block 302. After the packet aggregation process described in FIG. 3 is performed and an aggregate packet is generated, the flow continues at block 212.

The aggregate packet is provided to the network adapter to perform segmentation offload (212). For example, the socket aggregation unit 110 provides the aggregate packet to the network adapter 150. The network adapter 150 fragments the aggregate packet and transmits the fragmented data packets to the destination network device. In one implementation, the segmentation offload unit 155 performs segmentation offload by fragmenting the aggregate packets into smaller packets for transmission to the destination network device. For example, for TCP, the segmentation offload unit 155 fragments the packets into smaller packets with size that is less than or equal to the MTU size. The flow continues at block 214.

After aggregating the packets associated with the aggregate packet, it is determined whether additional packets are received from the application 105 (214). If additional packets are received from the application 105, the flow continues at block 210, where the packets are aggregated at the socket level according to the aggregation limits defined by the socket aggregation parameters. If no additional packets are received from the application 105, the flow ends.

Figure 3:
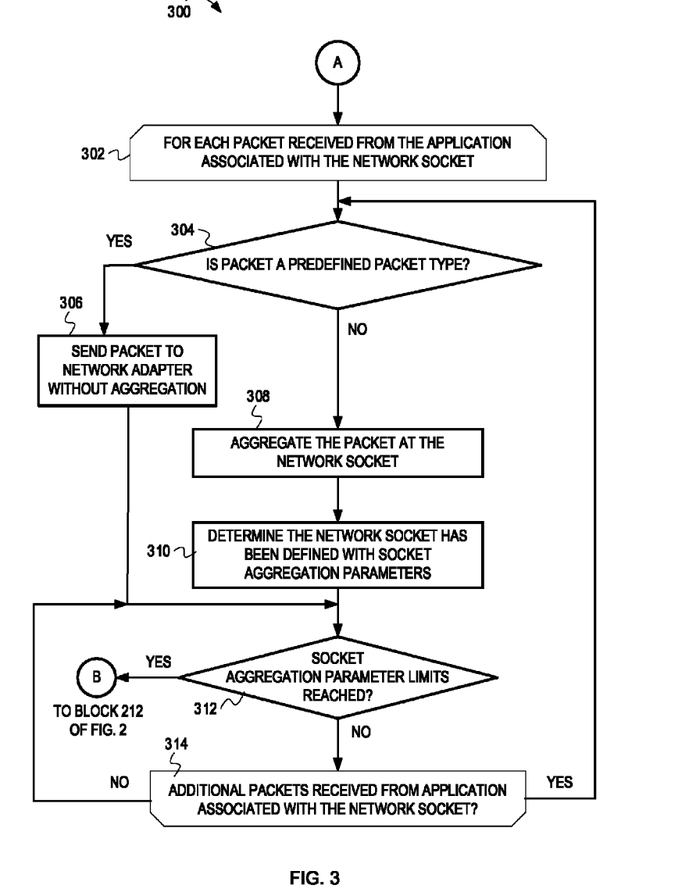
FIG. 3 is a flow diagram illustrating example operations for aggregating packets at the socket level according to the socket aggregation parameters.

FIG. 3 is a flow diagram 300 illustrating example operations for aggregating packets at the socket level according to the socket aggregation parameters. The flow begins at block 302

A loop begins for each packet received from the application 105 associated with the network socket (302). For example, the socket aggregation unit 110 performs at least a subset of the operations described in blocks 304-312 for each of the packets received from the application 105 associated with the network socket. The flow continues at block 304.

For each packet received from the application 105, it is determined whether the packet is one of a plurality of predefined packet types that should not be delayed, and therefore should not be aggregated at the socket level (304). The packet can include a flag, field code, or other indicator to indicate that the packet is one of the predefined packet types. The predefined packet types are packets that should be provided to the network adapter 150 and to the destination node as soon as possible without delay from aggregation. For example, in TCP, the socket aggregation unit 110 determines whether the packet is a SYN, FIN, RST, ACK, or URG packet type. If the packet is not one of the plurality of predefined packet types, the flow continues at block 308. Otherwise, if the packet is one of the predefined packet types, the flow continues at block 306.

If the packet is one of the predefined packet types, the packet is sent to the network adapter 150 without aggregation (306). For example, the socket aggregation unit 110 immediately sends the packet to the network adapter 150 via the network protocol stack without aggregating the packet in the socket buffer 112. The flow continues at block 312.

If the packet is not one of the plurality of predefined packet types, the packet is aggregated at the network socket (308).

For example, the socket aggregation unit 110 adds the packet to the socket buffer 112 associated with the network socket to aggregate the packet. The flow continues at block 310.

It is determined that the network socket has been defined with the socket aggregation parameters (310). For example, the socket aggregation unit 110 determines that the network socket has been defined with socket aggregation parameters by accessing the socket aggregation parameter table 122 (e.g., shown in FIG. 1). In another example, if the socket aggregation parameter table 122 has been created, the protocol control unit 120 can provide the socket aggregation parameters to the socket aggregation unit 110. If the network socket has not been defined with socket aggregation parameters, the socket aggregation unit 110 does not aggregate the packet and provides the packet to the network adapter 150. After determining that the network socket has been defined with the socket aggregation parameters, the flow continues at block 312.

It is determined whether the aggregation limits associated with the network aggregation parameters have been reached (312). The socket aggregation unit 110 determines whether at least one of the aggregation limits associated with the network aggregation parameters has been reached during the aggregation process. For example, the socket aggregation unit 110 determines whether the aggregation limit defined by the maximum aggregation size parameter or the aggregation limit defined by the aggregation timeout parameter has been reached during the aggregation process. For example, the socket aggregation unit 110 can monitor the amount data that is aggregated in the socket buffer 112 to determine whether the aggregation limit associated with the maximum aggregation size parameter is reached. The socket aggregation unit 110 can also utilize a timer to monitor the amount of time that expires since the aggregation operation is started, or since the last time at least one of the aggregation limits was reached (and an aggregate packet is generated), to determine whether the aggregation limit associated with the aggregation timeout parameter is reached. If at least one of the aggregation limits associated with the network aggregation parameters has been reached, the flow continues at block 212 of FIG. 2, where an aggregate packet is generated based on the aggregated data at the socket buffer 112, and the aggregate packet is provided to the network adapter 150 to perform segmentation offload. Otherwise, the flow continues at block 314.

If none of the aggregation limits associated with the network aggregation parameters have been reached, it is determined whether additional packets are received from the application 105 associated with the network socket (314). If additional packets are not received from the application 105 associated with the network socket, the flow continues at block 312, where it is determined whether the aggregation limits defined by the socket aggregation parameters have been reached. If additional packets are received from the application 105 associated with the network socket, the flow continues at block 304, where it is determined whether the packet is one of the plurality of predefined packet types.

In some embodiments, when at least one of the aggregation limits associated with the socket aggregation parameters has been reached, the socket aggregation unit 110 resets the monitoring of the aggregation limits associated with the socket aggregation parameters. For example, for the maximum aggregation size parameter, the socket aggregation unit 110 may clear the socket buffer 112 (or define a new socket buffer 112) and, in some implementations, also reset the last aggregation amount value determined from the socket buffer 112 for the amount of data that has been aggregated to zero. In one example, the socket aggregation unit 110 monitors the amount of data that has been aggregated in the socket buffer 112, and compares that value to the aggregation limit associated with the maximum aggregation size parameter. For the aggregation timeout parameter, the socket aggregation 110 may reset the timer that keeps track of the amount of time that has expired from either the beginning of the aggregation operation or from the last time that at least one of the aggregation limits associated with the socket aggregation parameters was reached. In one example, the socket aggregation unit 110 monitors the amount of time that has expired using the timer and compares the timer value to the aggregation limit associated with the aggregation timeout parameter.

It should be understood that the depicted diagrams (FIGS. 1-3) are examples meant to aid in understanding embodiments and should not be used to limit embodiments or limit scope of the claims. Embodiments may perform additional operations, fewer operations, operations in a different order, operations in parallel, and some operations differently. For example, the socket aggregation parameters can be obtained any time after the network socket is created to define the socket aggregation limits. The socket aggregation parameters can also be dynamically changed (e.g., by the application 105, system administrator, etc.) any time after the network socket has been created to dynamically redefine or reconfigure the socket aggregation limits. For example, after initially defining the network socket with original socket aggregation parameters, the application 105 can provide a subsequent packet or other type of message including updated socket aggregation parameters. In this example, the protocol control unit 120 can reconfigure or redefine the network socket based on the updated socket aggregation parameters, and the socket aggregation unit 110 can aggregate subsequent packets according to the aggregation limits associated with the updated socket aggregation parameters. In some implementations, when the protocol control unit 120 detects updated socket aggregation parameters, the socket aggregation unit 110 can continue to aggregate the data that is currently in the socket buffer 112 according to the updated socket aggregation parameters. In other implementations, when the protocol control unit 120 detects updated socket aggregation parameters, the socket aggregation unit 110 can send an aggregate packet comprising the data that is currently in the socket buffer 112, and then continue to aggregate subsequent packets received from the application 105 according to the updated socket aggregation parameters. It is further noted that although the configurable socket aggregation process has been shown for a network socket associated with the application 105, the configurable socket aggregation process to enable segmentation offload can be implemented concurrently for various network sockets associated with one or more application of the network device 100. Furthermore, although some examples describe implementing the configurable socket aggregation process in systems that implement TCP, the configurable socket aggregation process can be implemented in systems that implement other suitable connection protocols (e.g., user datagram protocol (UDP)).

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
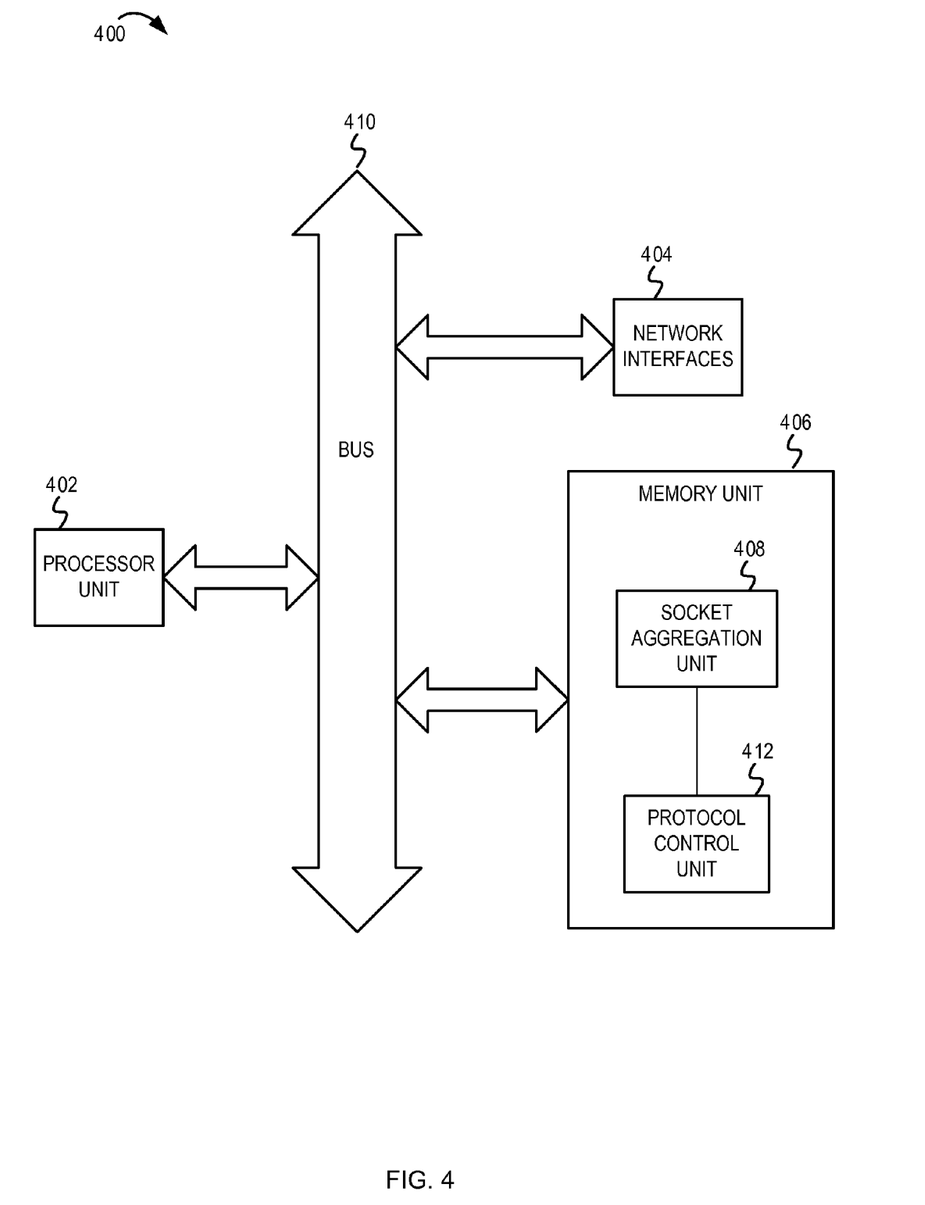
FIG. 4 is a block diagram of one embodiment of a computer system including a mechanism for implementing configurable network socket aggregation to enable segmentation offload.

FIG. 4 is a block diagram of one embodiment of a computer system 400 including a mechanism for implementing configurable network socket aggregation to enable segmentation offload. In some examples, the computer system may be a personal computer, a laptop, a server, or other machine that can communicate and exchange information in a client-server network. The computer system 400 includes a processor unit 402 (possibly including multiple processors, multiple cores, multiple nodes, and/or implementing multi-threading, etc.). The computer system 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 400 also includes a bus 410 (e.g., PCI, ISA, PCI-Express, HyperTransport®, InfiniBand®, NuBus, AHB, AXI, etc.), and network interfaces 404 that include at least one wireless and/or wired network interface (e.g., a WLAN interface, a Bluetooth® interface, a WiMAX interface, a ZigBee® interface, a Wireless USB interface, USB interface, Ethernet interface, etc.). The memory unit 406 embodies functionality to implement embodiments described above. For example, the memory unit 406 may comprise a socket aggregation unit 408 and a protocol control unit 412 that implements the functionality described above with reference to FIGS. 1-3.

Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, and the network interfaces 404 are coupled to the bus 410. Although illustrated as being coupled to the bus 410, the memory unit 406 may be coupled to the processor unit 402.

Figure 5:
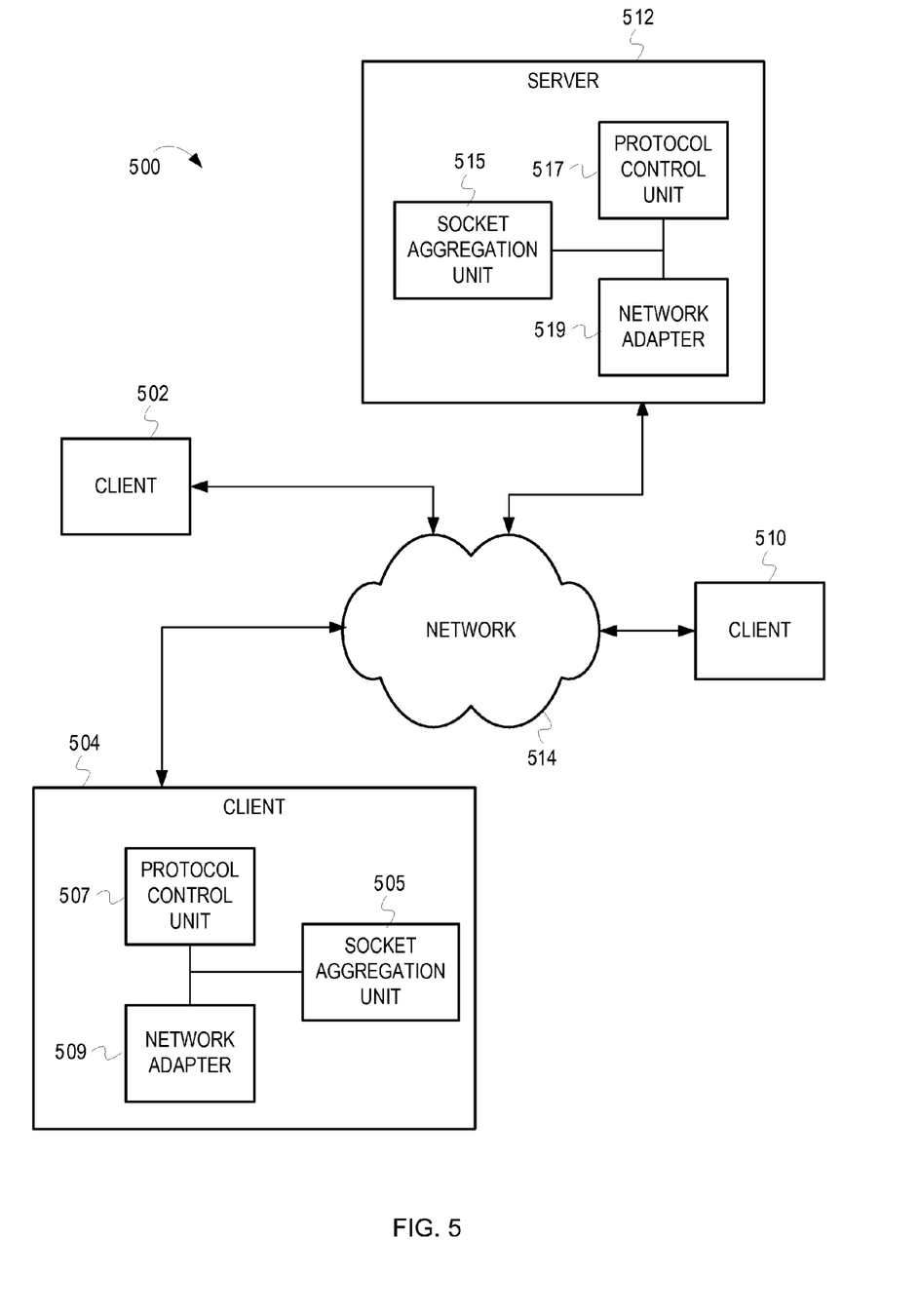
FIG. 5 is an example block diagram illustrating a system configured for implementing configurable network socket aggregation to enable segmentation offload.

FIG. 5 is an example block diagram illustrating a system 500 configured for implementing configurable network socket aggregation to enable segmentation offload. The system 500 comprises a server 512 and clients 502, 504, and 510. As shown, the server 512 comprises a socket aggregation unit 515, a protocol control unit 517, and a network adapter 519, and the client 504 comprises a socket aggregation unit 505, a protocol control unit 507, and a network adapter 509, which are configured to implement configurable network socket aggregation to enable segmentation offload at the server 512 and at the client 504, as described above with reference to FIGS. 1-4.

The server 512 communicates with the clients 502, 504, and 510 via a communication network 514. The communication network 514 can include any technology (e.g., Ethernet, IEEE 802.11n, SONET, etc.) suitable for communicating between the server 512 and the clients 502, 504, and 510. Moreover, the communication network 514 can be part of other networks, such as cellular telephone networks, public-switched telephone networks (PSTN), cable television networks, etc. Additionally, the server 512 and the clients 502, 504, and 510 can be any suitable devices capable of executing software in accordance with the embodiments described herein.

While the embodiments are described with reference to various implementations and exploitations, it will be understood that these embodiments are illustrative and that the scope of the inventive subject matter is not limited to them. In general, techniques for implementing configurable network socket aggregation to enable segmentation offload as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a network device, to create a network socket for an application of the network device to initiate a network connection for the application;
   determining socket aggregation parameters for the network socket associated with the application;
   defining the network socket based, at least in part, on the socket aggregation parameters;
   aggregating a plurality of packets received from the application associated with the network socket, wherein aggregating the plurality of packets includes, for a packet of the plurality of packets:
      determining whether the packet received from the application is one of a plurality of predefined packet types,
      providing the packet to the network adapter without aggregation if the packet is one of the plurality of predefined packet types, and
      aggregating the packet if the packet is not one of the plurality of predefined packet types;
   determining, based on said aggregating the plurality of packets received from the application, whether at least one aggregation limit associated with the socket aggregation parameters is reached; and
   providing an aggregate packet to a network adapter of the network device to perform segmentation offload in response to said determining that at least one aggregation limit associated with the socket aggregation parameters is reached.

2. The method of claim 1, wherein the socket aggregation parameters for the network socket associated with the application comprise a maximum aggregation size parameter and an aggregation timeout parameter.

3. The method of claim 1, wherein said aggregating the packet if the packet is not one of the plurality of predefined packet types further comprises:
   determining, based on said aggregating the packet if the packet is not one of the plurality of predefined packet types, whether at least one aggregation limit associated with the socket aggregation parameters is reached;
   providing the aggregate packet to the network adapter of the network device to perform segmentation offload in response to said determining that at least one aggregation limit associated with the socket aggregation parameters is reached; and
   continuing to aggregate one or more subsequent packets received from the application according to the aggregation limits associated with the socket aggregation parameters in response to said determining that at least one aggregation limit associated with the socket aggregation parameters is not reached.

4. The method of claim 3, further comprising, in response to said determining that at least one aggregation limit associated with the socket aggregation parameters is reached, resetting a monitoring of the aggregation limits associated with the socket aggregation parameters and continuing to aggregate one or more subsequent packets received from the application according to the aggregation limits associated with the socket aggregation parameters.

5. The method of claim 1, wherein said determining, based on said aggregating the plurality of packets received from the application, whether at least one aggregation limit associated with the socket aggregation parameters is reached comprises determining whether an aggregation limit associated with a maximum aggregation size parameter is reached or whether an aggregation limit associated with an aggregation timeout parameter is reached.

6. The method of claim 1, wherein said aggregating the plurality of packets received from the application associated with the network socket aggregating packet comprises aggregating the plurality of packets received from the application in a socket buffer associated with the network socket.

7. The method of claim 1, wherein said defining the network socket based, at least in part, on the socket aggregation parameters comprises creating a data structure to store the socket aggregation parameters and creating a pointer to a socket buffer associated with the network socket, and storing the socket aggregating parameters and the pointer to the socket buffer in the data structure.

8. The method of claim 1, wherein said determining socket aggregation parameters for the network socket associated with the application comprises at least one of:
   receiving the socket aggregation parameters from the application;
   receiving the socket aggregation parameters from a system administrator of the network device; and
   determining the socket aggregation parameters from predefined global socket aggregation parameters.

9. The method of claim 1, further comprising:
   determining updated socket aggregation parameters for the network socket associated with the application;
   reconfiguring the network socket according to the updated socket aggregation parameters; and aggregating subsequent packets received from the application associated with the network socket according to aggregation limits associated with the updated socket aggregation parameters.

10. A network communication device comprising:
a processor;
a network interface coupled with the processor;
a protocol control unit coupled with the processor and the network interface, the protocol control unit operable to,
  create a network socket for an application of the network communication device to initiate a network connection for the application;
  determine socket aggregation parameters for the network socket associated with the application;
  define the network socket based, at least in part, on the socket aggregation parameters; and
a socket aggregation unit coupled with the processor and the network interface, the socket aggregation unit operable to,
  aggregate a plurality of packets received from the application associated with the network socket, wherein the socket aggregation unit is operable to, for a packet of the plurality of packets:
    determine whether the packet received from the application is one of a plurality of predefined packet types,
    provide the packet to the network adapter without aggregation if the packet is one of the plurality of predefined packet types, and
    aggregate the packet if the packet is not one of the plurality of predefined packet types;
  determine whether at least one aggregation limit associated with the socket aggregation parameters is reached, in response to the socket aggregation unit aggregating the plurality of packets received from the application; and
  provide an aggregate packet to the network interface to perform segmentation offload, in response to the socket aggregation unit determining that at least one aggregation limit associated with the socket aggregation parameters is reached.

11. The network communication device of claim 10, wherein the socket aggregation parameters for the network socket associated with the application comprise a maximum aggregation size parameter and an aggregation timeout parameter.

12. The network communication device of claim 10, wherein the socket aggregation unit operable to aggregate the packet if the packet is not one of the plurality of predefined packet types further comprises the socket aggregation unit operable to,
  determine whether at least one aggregation limit associated with the socket aggregation parameters is reached;
  provide the aggregate packet to the network adapter of the network device to perform segmentation offload in response to the socket aggregation unit determining that at least one aggregation limit associated with the socket aggregation parameters is reached; and
  continue to aggregate one or more subsequent packets received from the application according to the aggregation limits associated with the socket aggregation parameters in response to the socket aggregation unit determining that at least one aggregation limit associated with the socket aggregation parameters is not reached.

13. The network communication device of claim 10, wherein:

the protocol control unit is further operable to,
  determine updated socket aggregation parameters for the network socket associated with the application; and
  reconfigure the network socket according to the updated socket aggregation parameters; and
the socket aggregation unit is further operable to,
  aggregate subsequent packets received from the application associated with the network socket according to aggregation limits associated with the updated socket aggregation parameters.

14. A computer program product for implementing configurable socket aggregation, the computer program product comprising:
a computer readable storage medium having computer readable program code embodied therewith, the computer readable program code configured to,
  determine, at a network device, to create a network socket for an application of the network device to initiate a network connection for the application;
  determine socket aggregation parameters for the network socket associated with the application;
  define the network socket based, at least in part, on the socket aggregation parameters;
  aggregate a plurality of packets received from the application associated with the network socket, wherein the computer readable program code is further configured to, for a packet of the plurality of packets:
    determine whether the packet received from the application is one of a plurality of predefined packet types,
    provide the packet to the network adapter without aggregation if the packet is one of the plurality of predefined packet types, and
    aggregate the packet if the packet is not one of the plurality of predefined packet types;
  determine whether at least one aggregation limit associated with the socket aggregation parameters is reached; and
  provide an aggregate packet to a network adapter of the network device to perform segmentation offload in response to determining that at least one aggregation limit associated with the socket aggregation parameters is reached.

15. The computer program product of claim 14, wherein the computer readable program code configured to aggregate the packet if the packet is not one of the plurality of predefined packet types further comprises the computer readable program code configured to:
  determine whether at least one aggregation limit associated with the socket aggregation parameters is reached;
  provide the aggregate packet to the network adapter of the network device to perform segmentation offload in response to determining that at least one aggregation limit associated with the socket aggregation parameters is reached; and
  continue to aggregate one or more subsequent packets received from the application according to the aggregation limits associated with the socket aggregation parameters in response to determining that at least one aggregation limit associated with the socket aggregation parameters is not reached.

16. The computer program product of claim 14, wherein the computer readable program code configured to aggregate the plurality of packets received from the application associated with the network socket aggregating packet comprises the computer readable program code configured to aggregate the plurality of packets received from the application in a socket buffer associated with the network socket.

17. The computer program product of claim 14, wherein the computer readable program code is further configured to:
- determine updated socket aggregation parameters for the network socket associated with the application;
- reconfigure the network socket according to the updated socket aggregation parameters; and
- aggregate subsequent packets received from the application associated with the network socket according to aggregation limits associated with the updated socket aggregation parameters.

18. A method comprising:
- determining, at a network device, to create a network socket for an application of the network device to initiate a network connection for the application;
- determining socket aggregation parameters for the network socket associated with the application;
- defining the network socket based, at least in part, on the socket aggregation parameters;
- for each packet of a plurality of packets received from the application associated with the network socket,
    - determining whether the packet received from the application is one of a plurality of predefined packet types;
    - providing the packet to the network adapter without aggregation if the packet is one of the plurality of predefined packet types; and
    - aggregating the packet if the packet is not one of the plurality of predefined packet types;
- in response to aggregating one or more packets of the plurality of packets received from the application, determining whether at least one aggregation limit associated with the socket aggregation parameters is reached; and
- providing an aggregate packet to a network adapter of the network device to perform segmentation offload in response to said determining that at least one aggregation limit associated with the socket aggregation parameters is reached.

19. The method of claim 18, wherein said determining whether at least one aggregation limit associated with the socket aggregation parameters is reached comprises determining whether an aggregation limit associated with a maximum aggregation size parameter is reached or whether an aggregation limit associated with an aggregation timeout parameter is reached.

20. The method of claim 18, further comprising:
- determining updated socket aggregation parameters for the network socket associated with the application;
- reconfiguring the network socket according to the updated socket aggregation parameters; and
- aggregating subsequent packets received from the application associated with the network socket according to aggregation limits associated with the updated socket aggregation parameters.

* * * * *